United States Patent
Reider et al.

(10) Patent No.: US 9,864,383 B2
(45) Date of Patent: Jan. 9, 2018

(54) METHOD AND SYSTEM FOR DETERMINING CHARACTERISTIC PARAMETERS OF A HYDRAULIC NETWORK

(71) Applicant: BELIMO HOLDING AG, Hinwil (CH)

(72) Inventors: Forest Reider, Wetzikon (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 350 days.

(21) Appl. No.: 14/692,058

(22) Filed: Apr. 21, 2015

(65) Prior Publication Data

US 2016/0291608 A1    Oct. 6, 2016

(30) Foreign Application Priority Data

Apr. 2, 2015    (CH) ........................................ 473/15

(51) Int. Cl.
*G05D 7/00* (2006.01)
*G05D 11/00* (2006.01)
(Continued)

(52) U.S. Cl.
CPC ....... *G05D 7/0676* (2013.01); *F24D 19/1009* (2013.01); *F24D 19/1015* (2013.01);
(Continued)

(58) Field of Classification Search
CPC .... G05B 15/02; G05D 7/0623; G05D 7/0641; G05D 7/0676; G05D 23/19;
(Continued)

(56) References Cited

U.S. PATENT DOCUMENTS

2010/0049480 A1    2/2010    Pekar et al.
2010/0147394 A1    6/2010    Trnka et al.
(Continued)

FOREIGN PATENT DOCUMENTS

CH    705143 A1    12/2012
DE    19912588 A1    9/2000
(Continued)

OTHER PUBLICATIONS

G. F. Carlson., "Hydronic System Flow Balance-water Side", Ashrae Journal, Oct. 1968, XP 000670183, pp. 34-43.
Communication dated Jun. 24, 2015, issued by the Swiss Federal Institute of Intellectual Property in counterpart Application No. 00473/15.

*Primary Examiner* — Mark Connolly
(74) *Attorney, Agent, or Firm* — Sughrue Mion, PLLC (57) ABSTRACT

A hydraulic network (1) having plural parallel zones (Z1, Z2) with a regulating valve (V1, V2) in each zone for regulating a flow of fluid ($\varphi 1$, $\varphi 2$) through respective zones. Characteristic parameters of the hydraulic network (1) include static flow capacity values (Kex,a, Kex,b) of the zones. Measurement data sets are recorded which include a determined value of a hydraulic system variable of the hydraulic network (1), e.g. the total flow ($\varphi$tot) or the system pressure ($\Delta P$), and valve positions of the regulating valves (V1, V2) set for the determined value of the hydraulic system variable. The characteristic parameters are calculated from plural measurement data sets, by grouping related measurement data sets, which include the same value of the hydraulic system variable but different valve positions, and by using the flow capacity (Kvalve,a, Kvalve,b) of the regulating valves (V1, V2) at the valve positions included in the data sets.

20 Claims, 4 Drawing Sheets (51) Int. Cl.
*G05D 7/06* (2006.01)
*G05B 15/02* (2006.01)
*G05D 23/19* (2006.01)
*F24D 19/10* (2006.01)

(52) U.S. Cl.
CPC ..... *F24D 19/1033* (2013.01); *F24D 19/1036* (2013.01); *G05B 15/02* (2013.01); *G05D 7/0623* (2013.01); *G05D 7/0641* (2013.01); *G05D 23/19* (2013.01)

(58) Field of Classification Search
CPC ............. F24D 19/1009; F24D 19/1015; F24D 19/1033; F24D 19/1036
See application file for complete search history.

(56) References Cited

U.S. PATENT DOCUMENTS

| | | |
|---|---|---|
| 2011/0297364 A1 | 12/2011 | Loeffler |
| 2014/0150883 A1* | 6/2014 | Lederle ............... F24D 19/1009 137/10 |
| 2015/0316935 A1* | 11/2015 | Schmidlin ........... F24D 19/1015 700/282 |

FOREIGN PATENT DOCUMENTS

| | | |
|---|---|---|
| DE | 102010022763 A1 | 12/2011 |
| EP | 0795724 A1 | 9/1997 |
| EP | 2085707 A2 | 8/2009 |
| EP | 2157376 A2 | 2/2010 |
| EP | 2395288 A1 | 12/2011 |

* cited by examiner

METHOD AND SYSTEM FOR DETERMINING CHARACTERISTIC PARAMETERS OF A HYDRAULIC NETWORK

FIELD OF THE INVENTION

The present invention relates to a method and a computer system for determining characteristic parameters of a hydraulic network. Specifically, the present invention relates to a method and a computer system for determining characteristic parameters of a hydraulic network that comprises a plurality of parallel zones with a regulating valve in each zone for regulating a flow of fluid through the respective zone.

BACKGROUND OF THE INVENTION

Fluid transport systems typically comprise multiple consumers, meaning parallel branches or lines, through which a liquid or gaseous fluid is transported—for example to distribute thermal energy. The consumers typically have different designs, meaning that they have different diameters and/or lengths of the transport lines—for example, pipe conduits—and have different and/or varying flow volumes and/or throughput. In order to undertake a balanced and/or compensated distribution of the fluids to the consumers in such fluid transport systems, the consumers are each configured with a compensation- or balancing organ, for example an adjustable actuator, particularly a valve, which can set the flow through the respective consumer at different degrees of opening and/or valve positions.

A balancing method for a network for the distribution of a non-compressed liquid is described in DE 69706458, wherein for each branch, two pressure connection points are arranged on both sides of the compensating organ, and a further third pressure connection point is arranged at a distance therefrom. In all branches, flow measurements are carried out by measuring the difference in flow on both sides of the respective compensating organ, and a measurement of a pressure difference is carried out by means of the third pressure connection point. On the basis of these measured values, the hydraulic flow capacity coefficients of all branches and segments on the primary line are calculated. Finally, the adjustment positions of each compensating organ are calculated and set on the basis of knowledge of the desired flow in each branch and utilizing the specific flow capacity coefficients. The compensation method requires multiple pressure connection points for each compensating organ, and is not designed for a dynamic balancing of a fluid transport system.

EP 2 085 707 shows the hydraulic balancing of a heating system, wherein a heating element is equipped with a measuring device for measurement of the pressure and flow volume. Means are included for the detection of the flow volume as provided, as are means for detecting the pressure difference between the in-flow and the outlet flow. Means for the detection of the flow volume are arranged on the heating element, and serve the purpose of eliminating errors and automating the balancing. EP 0 795 724, which is in the same patent family as DE 69706458, shows substantially the same features as DE 69706458.

DE 199 12 588 shows a hydraulic system having multiple conduit lines. For the purpose of improving the regulating behavior, valves with an electronic flow volume measuring device and an actuator drive are arranged in both a primary circuit and in the conduit lines of the consumer circuits.

EP 2 157 376 shows an arrangement for hydraulically balancing a system for the purpose of cooling or heating. The system has an in-flow line, an outlet flow line, a throttle device, and a measuring device for a flow volume. Valves are included in each line for the purpose of hydraulic balancing, and measuring means are included for the purpose of determining the flows into the individual lines.

U.S. Pat. No. 8,024,161 describes a method and system for optimal model-based multivariable balancing for distributed hydraulic networks based on global differential pressure/flow rate information. U.S. Pat. No. 8,024,161 uses a simplified mathematical model of a hydraulic network and a set of measured flow values in all the zones of the hydraulic network to identify unknown network parameters. According to U.S. Pat. No. 8,024,161, valve settings are balanced by calculating the sum of pressure drops across the balancing valves and by solving an optimization problem to minimize the sum of pressure drops across the balancing valves in a non-iterative approach.

Therefore, in these prior art systems, a separate sensor is included in each consumer for the purpose of determining the flow. As a result, a great degree of complexity is particularly inherent in the installation process.

SUMMARY OF THE INVENTION

It is an object of this invention to provide a method and a computer system for determining characteristic parameters of a hydraulic network, which method and system do not have at least some of the disadvantages of the prior art. In particular, it is an object of the present invention to provide a method and a computer system for determining static flow capacity values of zones of the hydraulic network, without at least some of the disadvantages of the prior art.

According to the present invention, these objects are achieved through the features of the independent claims. In addition, further advantageous embodiments follow from the dependent claims and the description.

A hydraulic network comprises a plurality of parallel zones with a regulating valve in each zone for regulating a flow of fluid through the respective zone. The regulating valves represent a variable flow capacity in each zone.

According to the present invention, the above-mentioned objects are particularly achieved in that for determining characteristic parameters of a hydraulic network, the characteristic parameters including static flow capacity values of the zones, a total flow of fluid into all the zones is determined. In a computer, measurement data sets are recorded which include a determined value of a hydraulic system variable of the hydraulic network and valve positions of the regulating valves set for the determined value of the hydraulic system variable. Depending on the embodiment, the total flow into all the zones or the system pressure of the hydraulic network is determined as the hydraulic system variable of the hydraulic network. The computer calculates the characteristic parameters from a plurality of measurement data sets, by grouping related measurement data sets, which include the same value of the hydraulic system variable (e.g. the same total flow or system pressure) but different valve positions, and by using the value of flow capacity of the regulating valves at the valve positions included in the data sets.

In an embodiment, recording the measurement data sets comprises the computer recording the related measurement data sets during a measurement phase, by transmitting control signals to the regulating valves to set the regulating valves to varying valve positions that produce a particular value of the hydraulic system variable (e.g. a particular total flow or system pressure).

In an embodiment, the computer is recording the measurement data sets during regular operation of the hydraulic network and the computer determines the related measurement data sets by selecting the measurement data sets that include the same value of the hydraulic system variable (e.g. the same total flow or system pressure) but different valve positions of the valves.

In an embodiment, the characteristic parameters are calculated by the computer setting up a plurality of equations for the hydraulic network, including the static flow capacity values of the zones as unknown variables, using the value of flow capacity of the regulating valves at the valve positions recorded in the related measurement data sets, and solving the plurality of equations based on the fact that the related measurement data sets were recorded for the same value of the hydraulic system variable (e.g. the same total flow or system pressure). Accordingly, the number of unknown variables may be reduced by setting equal equations for the same value of the hydraulic system variable (e.g. the same total flow or system pressure).

In an embodiment, the characteristic parameters are calculated by the computer performing statistical algorithms, using the recorded measurement data sets as input data for determining estimated values of the characteristic parameters.

In an embodiment, the characteristic parameters are calculated by the computer performing statistical algorithms, using as input data measurement data sets, recorded in a first time period, for determining a first estimate of the characteristic parameters, and using as input data the first estimate of the characteristic parameters and measurement data sets, recorded in a second time period after the first time period, for determining a refined second estimate of the characteristic parameters.

In an embodiment, the computer determines a first set of characteristic parameters for an initial, simplified first model of the hydraulic network, and, subsequently, the computer determines a second set of characteristic parameters for an advanced, comparatively more detailed second model of the hydraulic network, using the first set of characteristic parameters. The advanced second model of the hydraulic network is more detailed compared to the initial first model of the hydraulic network in that it comprises more characteristic parameters, e.g. more static flow capacities (flow coefficients), than the initial, simplified first model of the hydraulic network.

In an embodiment, the computer determines the value of flow capacity of the regulating valves using valve characteristics stored at the computer.

In an embodiment, a common flow sensor measures the total flow of fluid into all the zones, and the measured total flow is transmitted to the computer.

In an embodiment, the computer calculates the values of the individual flow of fluid into the individual zones from the total flow of fluid, using the characteristic parameters of the hydraulic network calculated by the computer.

In an embodiment, the measurement data sets are stored in a cloud-based computer system and the characteristic parameters are calculated by a computer of the cloud-based computer system from a plurality of the stored measurement data sets.

In an embodiment, the hydraulic network further comprises a bypass line in parallel to the zones with a valve in the bypass line for setting a bypassing flow of fluid through the bypass line. The characteristic parameters further include a static flow capacity value representative of the bypass line and its valve. Determined in the computer is the total flow of fluid into all the zones and the bypass line. The computer calculates the characteristic parameters from a plurality of measurement data sets, by grouping related measurement data sets which include the same total flow into all the zones and the bypass line.

In an embodiment, the hydraulic network further comprises a pump. The computer calculates characteristic parameters of a pump curve of the pump, using at least two measurements of the total flow, measured with all but one of the regulating valves set to a closed valve position, and using valve characteristics of the one regulating valve that is not set to the closed valve position but to a different valve position for each of the at least two measurements of the total flow.

In an embodiment, the hydraulic network further comprises a pump and the computer calculates and sets adjusted valve positions with reduced variable flow capacity of the regulating valves and reduced power of the pump, while maintaining the total flow of fluid, using the characteristic parameters of the hydraulic network calculated by the computer.

In an embodiment, at least some of the regulating valves are implemented as six-way valves configured to couple a respective zone alternatively to a first fluid transportation circuit for heating or to a second fluid transportation circuit for cooling, and to regulate the flow of fluid from the first or second fluid transportation, respectively, through the zone. The computer determines the characteristic parameters of a first hydraulic sub-network that comprises the zones coupled to the first fluid transportation circuit for heating, and of a second hydraulic sub-network that comprises the zones coupled to the second fluid transportation circuit for cooling.

In an embodiment, at least some of the regulating valves are configured to further regulate thermal power, thermal energy, and/or temperature difference in the respective zone. In other words, these valves are configured to control the thermal power and/or thermal energy exchanged in the zone, e.g. by one or more thermal exchangers (heater or cooler) in the zone, and/or the temperature difference between the temperature of the fluid entering the zone (or thermal exchanger) and the temperature of the fluid exiting the zone (or thermal exchanger).

In addition to a method of determining characteristic parameters of a hydraulic network, the present invention also relates to a computer system for implementing and executing the method; specifically, a computer system for determining the characteristic parameters of the hydraulic network. The computer system comprising a processor configured to store measurement data sets which include valve positions for a value of a hydraulic system variable of the hydraulic network measured with the regulating valves set to the respective valve positions, and to calculate the characteristic parameters from a plurality of measurement data sets, by grouping related measurement data sets, which include the same value of the hydraulic system variable but different valve positions, and using the value of flow capacity of the regulating valves at the valve positions included in the data sets.

In an embodiment, the computer system or its processor, respectively, is configured to calculate the characteristic parameters by setting up a plurality of equations for the hydraulic network, including the static flow capacity values of the zones as unknown variables, using the value of flow capacity of the regulating valves at the valve positions recorded in the related measurement data sets, and by solving the plurality of equations based on the fact that the related measurement data sets were recorded for the same value of the hydraulic system variable.

In further embodiments, the computer system or its processor, respectively, is configured to implement further embodiments of the method described above.

In addition to a method and a computer system for determining characteristic parameters of a hydraulic network, the present invention also relates to a computer program product for controlling a computer to implement and execute the method; specifically, a computer program product comprising a non-transient computer-readable medium having stored thereon computer program code configured to control one or more processors of a computer system for determining characteristic parameters of the hydraulic network. The computer program code is configured to control the processors of the computer system such that the computer system stores measurement data sets which include valve positions for a value of a hydraulic system variable of the hydraulic network measured with the regulating valves set to the respective valve positions, and such that the computer system calculates the characteristic parameters from a plurality of measurement data sets, by grouping related measurement data sets, which include the same value of the hydraulic system variable but different valve positions, and using the value of flow capacity of the regulating valves at the valve positions included in the data sets.

In an embodiment, the computer program code is configured to control the processors of the computer system such that the computer system calculates the characteristic parameters by setting up a plurality of equations for the hydraulic network, including the static flow capacity values of the zones as unknown variables, using the value of flow capacity of the regulating valves at the valve positions recorded in the related measurement data sets, and by solving the plurality of equations based on the fact that the related measurement data sets were recorded for the same value of the hydraulic system variable.

In further embodiments, the computer program code is configured to control the processors of the computer system such that the computer system implements further embodiments of the method described above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
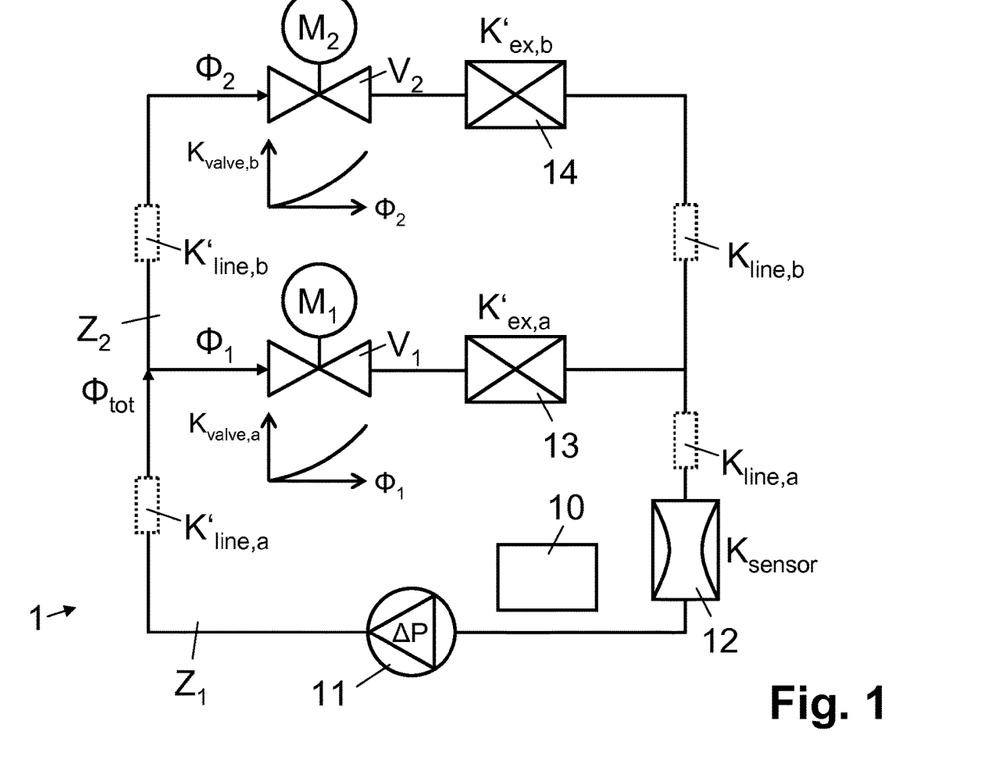
FIG. 1: shows a block diagram illustrating schematically an example of simple hydraulic network, comprising a pump and two zones with a regulating valve and a thermal exchanger in each zone.
Figure 7:
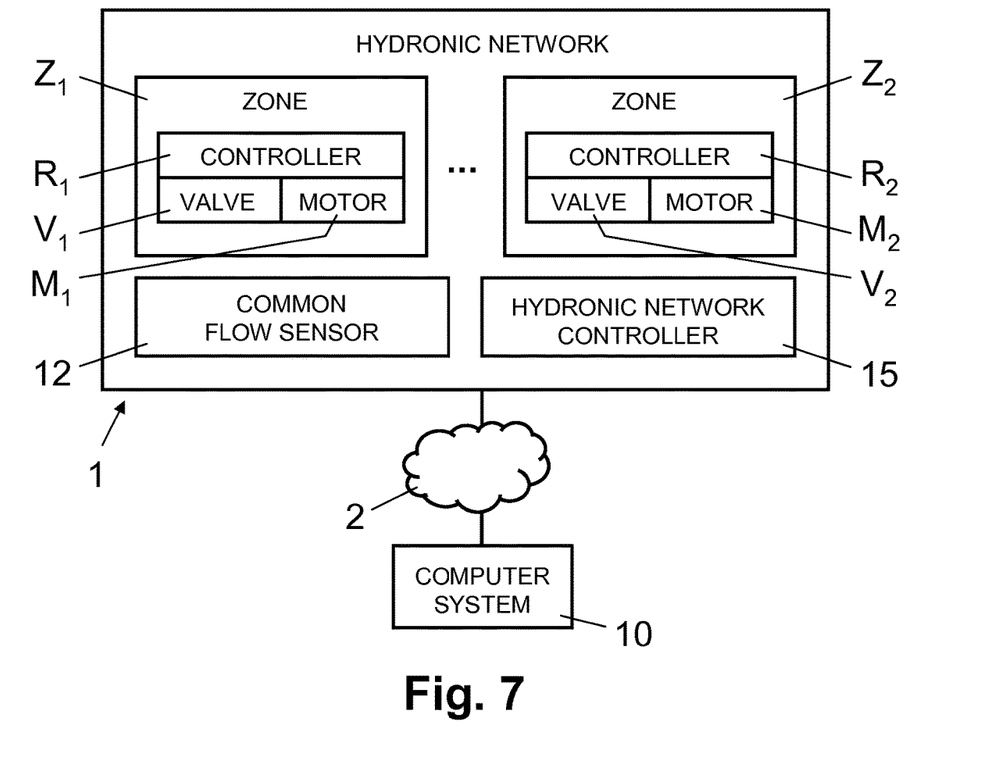
FIG. 7: shows a block diagram illustrating schematically an example of a hydraulic network and a cloud-based computer system for determining characteristic parameters of the hydraulic network.
Figure 8:
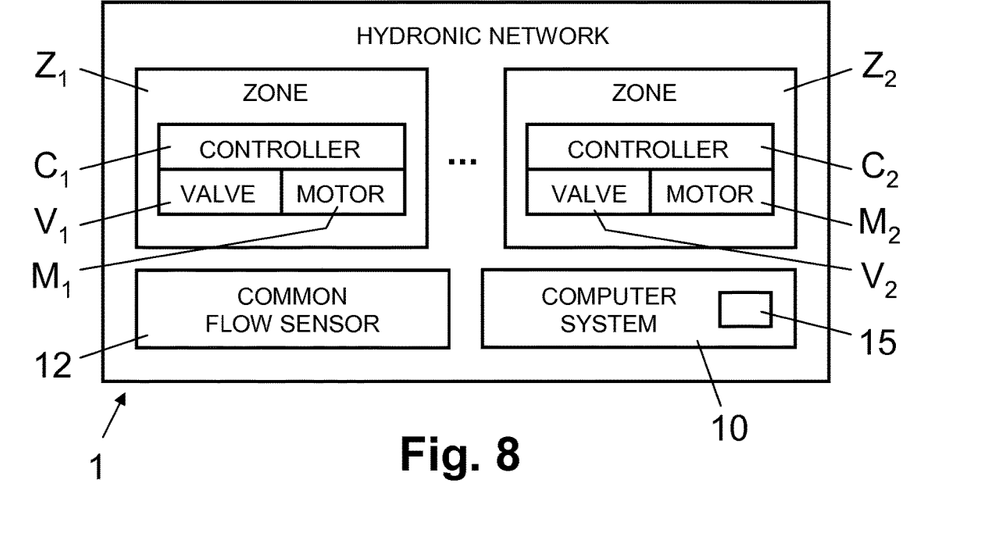
FIG. 8: shows a block diagram illustrating schematically an example of a hydraulic network and a local computer system for determining characteristic parameters of the hydraulic network.

In FIGS. 1, 7, and 8, reference numeral 1 refers to a hydraulic network that comprises a plurality of parallel zones $Z_1$, $Z_2$. The hydraulic network 1 includes one or more circuits with fluid transportation lines, e.g. pipes, for transporting a liquid heat transportation medium, e.g. water. As illustrated schematically in FIGS. 1, 7, and 8, each of the zones $Z_1$, $Z_2$ comprise a regulating valve $V_1$, $V_2$ for regulating the flow of fluid $\varphi_1$, $\varphi_2$ through the respective zone $Z_1$, $Z_2$. Although not illustrated, in a different configuration, the hydraulic network 1 further comprises a bypass line in parallel to the zones $Z_1$, $Z_2$. The bypass line comprises a regulating valve for regulating the flow of fluid through the bypass line. It should be noted that the hydraulic network 1 shown in FIG. 1 is highly simplified and in actual configurations comprises more than two zones $Z_1$, $Z_2$. As shown in FIG. 1, the hydraulic network 1 further comprises a common source, e.g. a motorized pump 11. As illustrated in FIGS. 1, 7, and 8, the hydraulic network 1 further includes a common flow sensor 12, arranged in the main line and configured to measure the total flow of fluid φtot, e.g. $\varphi_{tot}=\varphi_1+\varphi_2$, into all the zones $Z_1$, $Z_2$ (and the bypass line, if applicable). In an embodiment, the hydraulic network 1 includes optionally individual flow sensors arranged in the zones $Z_1$, $Z_2$, e.g. with the regulating valves $V_1$, $V_2$, for measuring the individual flows of fluid $\varphi_1$, $\varphi_2$ through the zones $Z_1$, $Z_2$ or regulating valves $V_1$, $V_2$, respectively. As shown in FIG. 1, the zones $Z_1$, $Z_2$ further include thermal exchangers 13, 14, e.g. a heat exchanger for heating the zone $Z_1$, $Z_2$ or a cooling device for cooling the zone $Z_1$, $Z_2$. Optionally, the hydraulic network 1 includes a pressure sensor configured and arranged to measure the (differential) system pressure ΔP of the hydraulic network 1, e.g. the pressure drop over the pump 11.

In some embodiments, at least some of the regulating valves $V_1$, $V_2$ are implemented as six-way valves which are configured to couple a respective zone $Z_1$, $Z_2$ and its thermal exchanger 13, 14 alternatively to a first fluid transportation circuit (driven by a first pump 11) for heating or to a second fluid transportation circuit (driven by a second pump 11) for cooling, and to regulate the flow of fluid $\varphi_1$, $\varphi_2$ from the first or second fluid transportation, respectively, through the zone $Z_1$, $Z_2$ and its thermal exchanger 13, 14. Depending on the current state of coupling set by the six-way valves, the hydraulic network 1 actually comprises a first hydraulic sub-network, that comprises the first fluid transportation circuit for heating and the zones $Z_1$, $Z_2$ coupled to the first fluid transportation circuit for heating, and a second hydraulic sub-network, that comprises the second fluid transportation circuit for cooling and the zones $Z_1$, $Z_2$ coupled to the second fluid transportation circuit for cooling.

As is illustrated schematically in FIGS. 1, 7, and 8, the regulating valves $V_1$, $V_2$ are driven by (electric) motors $M_1$, $M_2$ for adjusting the orifice and thus flow of fluid $\varphi_1$, $\varphi_2$ through the valve $V_1$, $V_2$. The motors $M_1$, $M_2$ are controlled by controllers $R_1$, $R_2$ that are connected electrically or electromagnetically to the motors $M_1$, $M_2$. The controllers $R_1$, $R_2$ each include an electronic circuit, e.g. a programmable processor, an application specific integrated circuit (ASIC), or another logic unit. For example, a motor $M_1$, $M_2$ and a controller $R_1$, $R_2$ form an actuator in a common actuator housing. The actuators or controllers $R_1$, $R_2$, respectively, further comprise a communication module configured for wireless and/or wired data communication with an external hydraulic network controller 15 and/or a computer system 10. The hydraulic network controller 15 comprises one or more programmable processors and a data storage system connected to the processor(s). The computer system 10 comprises one or more operational computers with one or more programmable processors and a data storage system connected to the processor(s). The hydraulic network controller 15 and the computer system 10 are configured (programmed) to perform various functions described later in more detail.

As illustrated in FIGS. 7 and 8, depending on configuration end embodiment, the computer system 10 is arranged on-site, as part of the hydraulic network 1 environment, e.g. in the same building or premises, or in a remote location, connected to the hydraulic network 1 and/or a hydraulic network controller 15 via a communications network 2. The communications network 2 includes fixed and/or mobile communications networks, e.g. WLAN (Wireless Local Area Network), GSM (Global System for Mobile Communications), UMTS (Universal Mobile Telephone System), or other mobile radio networks. In an embodiment, the communications network 2 includes the Internet and the computer system 10 is implemented as a cloud-based computer system.

FIG. 1 illustrates schematically the static and variable flow capacities (also referred to as variable flow coefficients) of the hydraulic network 1. Specifically, in FIG. 1, the reference numerals $K_{line,a}$, $K'_{line,a}$, $K_{line,b}$ and $K'_{line,b}$ refer to the static line flow capacities of the zones $Z_1$, or $Z_2$, respectively; $K'_{ex,a}$ and $K'_{ex,b}$ refer to the static flow capacities of the thermal exchangers 13 or 14, respectively; $K_{valve,a}$ and $K_{valve,b}$ refer to the variable flow capacities of the regulating valves $V_1$ or $V_2$, respectively; and $K_{sensor}$ refers to the static flow capacity (also referred to as static flow coefficient) of the common flow sensor 12. FIG. 1 further illustrates schematically the known valve characteristics of the regulating valves $V_1$ or $V_2$. The valve characteristics indicate for a defined pressure the flow of fluid $\varphi 1$, $\varphi 2$ through the valve $V_1$, $V_2$ depending on the valve position (or degree of orifice or opening). Correspondingly, the valve characteristics indicate for a defined (differential) pressure $\Delta P$ and flow of fluid $\varphi$, the respective flow capacity K (flow coefficient) of the valve, as outlined in the general relationship below:

$$\Delta P = \frac{\Phi^2}{K^2} \rightarrow \frac{1}{K^2} = \frac{\Delta P}{\Phi^2} \tag{1}$$

As one skilled in the art will understand, the flow capacity K (flow coefficient) further depends on the specific gravity of the respective fluid SG (for water SG=1), as indicated in equation 1 'below:

$$K = \Phi \sqrt{\frac{SG}{\Delta P}} \tag{1'}$$

Using the following equations for flow capacities (flow coefficients) arranged in parallel:

$$K_{total} = K_1 + K_2 \tag{2}$$

and for flow capacities (flow coefficients) arranged in series:

$$\frac{1}{K_{total}^2} = \frac{1}{K_1^2} + \frac{1}{K_2^2}, \tag{3}$$

Figure 2:
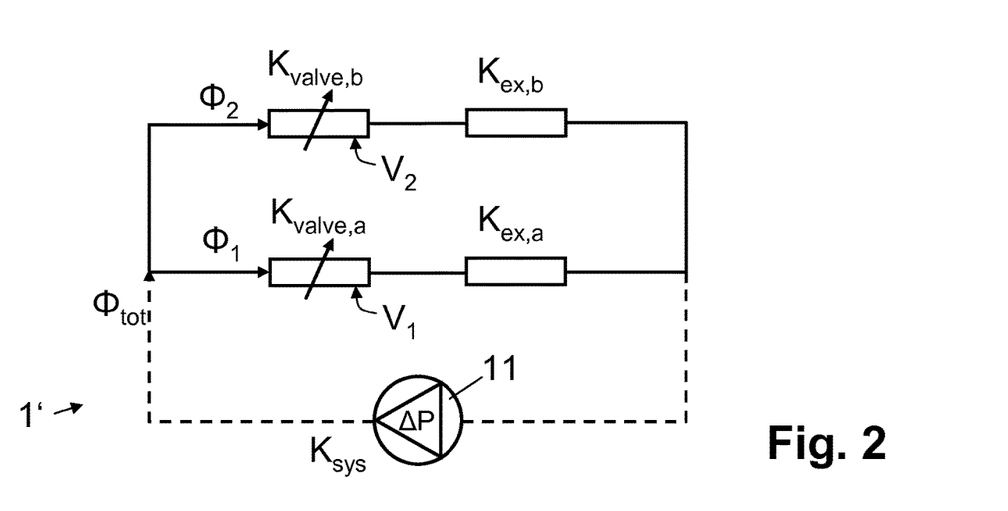
FIG. 2: shows a block diagram illustrating schematically a simplified representation of the hydraulic network with the two zones and regulating valves and thermal exchangers in the zones.

FIG. 2 illustrates schematically a simplified representation 1' of the hydraulic network 1. In the simplified representation 1' of the hydraulic network 1, all the static flow capacities of the zones $Z_1$ or $Z_2$, are lumped into the respective static flow capacities $K_{ex,a}$ and $K_{ex,b}$; $K_{valve,a}$ and $K_{valve,b}$ refer to the variable flow capacities of the regulating valves $V_1$ or $V_2$ in these zones $Z_1$ or $Z_2$, respectively; and $K_{sys}$ refers to the total system flow capacity (flow coefficient) of the hydraulic network 1.

The system pressure $\Delta P$ is not known, but assumed to be a function of flow $\varphi$, i.e. whenever the flow $\varphi$ is a given value, the pressure $\Delta P$ has a given value, because the common source, e.g. the pump 11, is assumed to operate on a pump curve, at least during measurement and recording of data sets $S_i$, including valve positions and associated total flow values, as will be explained below in more detail. A linear pump curve is defined by characteristic pump curve parameters $C_1$ and $C_2$, for example:

$$\Delta P = \varphi C_1 + C_0 \tag{4}$$

Thus, when the pump 11 follows or "rides" a pump curve, the pressure $\Delta P$ is a function of flow $\varphi$.

In the following paragraphs, described with reference to FIGS. 3-6 are possible sequences of steps performed by the hydraulic network controller 15 and/or the computer system 10 for determining the characteristic parameters of the hydraulic network 1, specifically, the static flow capacity (flow coefficient) values of its zones $Z_1$, $Z_2$.

It should be pointed out that for hydraulic networks 1 that include six-way regulating valves, the characteristic parameters are determined for the first hydraulic sub-network, that comprises the zones $Z_1$, $Z_2$ coupled to the first fluid transportation circuit for heating, and for the second hydraulic sub-network, that comprises the zones $Z_1$, $Z_2$ coupled to the second fluid transportation circuit for cooling.

Figure 3:
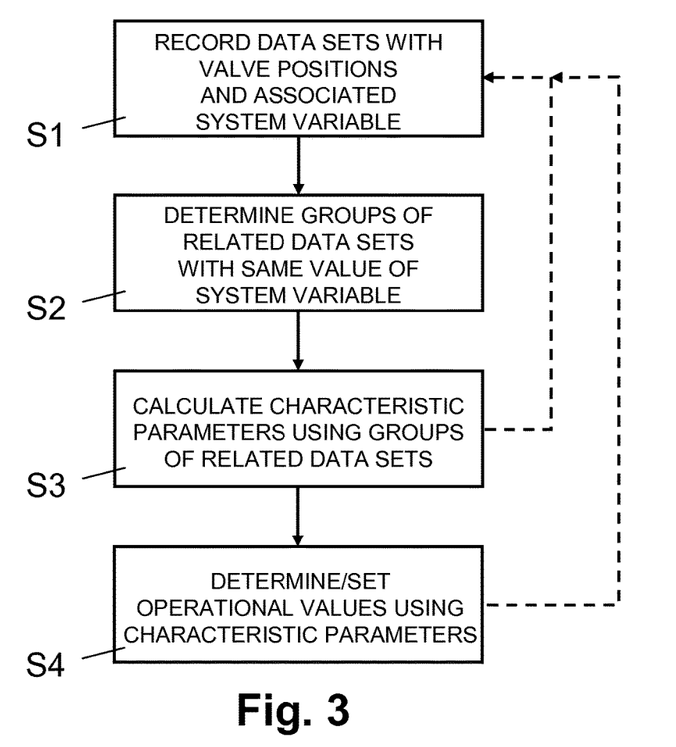
FIG. 3: shows a flow diagram illustrating an exemplary sequence of steps for determining and using characteristic parameters of a hydraulic network.

As illustrated in FIG. 3, in step S1, the computer system 10 records data sets $S_i$ with valve positions $Pos_{Vn\_i}$ and associated values of a hydraulic system variable of the hydraulic network 1, e.g. total flow $\varphi_{tot\_i}$ or system pressure $\Delta p_i$ values. In case of the flow-based approach, each data set $S_i$ includes a total flow $\varphi_{tot\_i}$, measured in the hydraulic system 1 and the valve positions $Pos_{Vn\_i}$ of the regulating valves $V_1$, $V_2$ at which that particular total flow $\varphi_{tot\_i}$ was measured $S_i = \{\varphi_{tot\_i}; (Pos_{V1\_i}; Pos_{V2\_i}; \ldots ; Pos_{Vn\_i})\}$.

Figure 4:
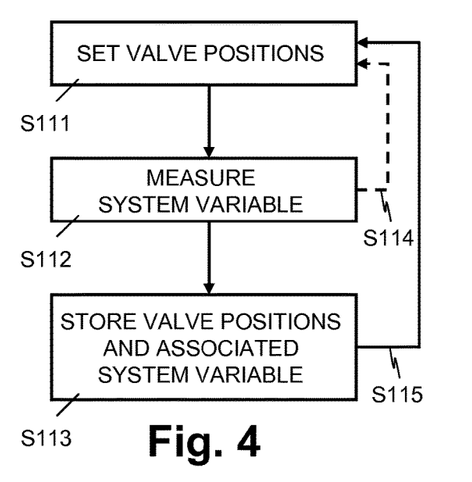
FIG. 4: shows a flow diagram illustrating an exemplary sequence of steps for recording data sets with valve positions and associated values of hydraulic system parameter, measured with the valves set to these positions.
Figure 5:
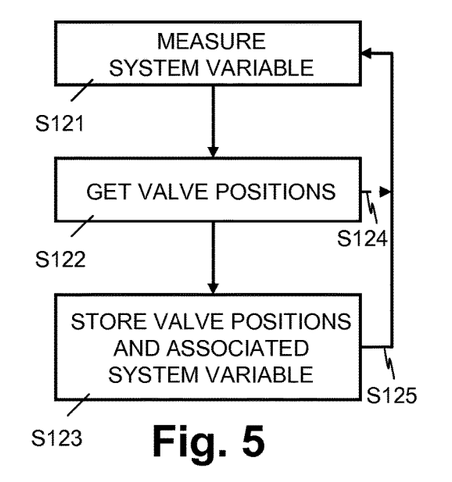
FIG. 5: shows a flow diagram illustrating another exemplary sequence of steps for recording data sets with valve positions and associated values of hydraulic system parameter, measured with the valves set to these positions.

FIGS. 4 and 5 illustrate two embodiments and/or configurations for recording the data sets $S_i$ with valve positions $Pos_{Vn\_i}$ and the values of the hydraulic system variable, e.g. total flow $\varphi_{tot\_i}$ or system pressure $\Delta p_i$ values obtained and measured with the regulating valves set to these positions $Pos_{Vn\_i}$.

FIG. 4 illustrates an embodiment or configuration where the valve positions $Pos_{Vn\_i}$ are set specifically, in a controlled manner, for recording the data sets $S_i$ with the values of the hydraulic system variable, e.g. total flow $\varphi_{tot\_i}$ or system pressure $\Delta p_i$ values, respectively, measured at these specific and controlled settings of the regulating valves $V_1$, $V_2$. For example, the valve positions $Pos_{Vn\_i}$ are set by the computer system 10 and/or the hydraulic network controller 15 by way of control signals, e.g. during a measurement phase.

FIG. 5, on the other hand, illustrates an embodiment or configuration where a plurality of data sets $S_i$ are continuously or periodically recorded, e.g. during regular operation of the hydraulic network 1, at whatever valve positions $Pos_{Vn\_i}$ the regulating valves $V_1$, $V_2$ are set, e.g. in response to the demands and requests of a building control system, with the total flow $\varphi_{tot\_i}$ values measured at these current settings of the regulating valves $V_1$, $V_2$. In the pressure-based approach, the system pressure $\Delta p_i$ values are measured by means of a pressure sensor or calculated from the total flow $\varphi_{tot\_i}$ values. In the latter case, the pressure $\Delta p$ drop across the pump 11 is calculated using the pump curve, $\Delta P = \Phi C_1 + C_0$, defined above in equation (4). The determination of the characteristic pump curve parameters $C_1$ and $C_2$ will be described later in more detail.

In step S111 shown in FIG. 4, the computer system 10 and/or the hydraulic network controller 15 sets the valve positions of the regulating valves $V_1$, $V_2$ to specific, known valve positions $Pos_{Vn\_i}$. For example, the valve positions $Pos_{Vn\_i}$ are defined in a system evaluation protocol or script.

In step S112, the computer system 10 obtains the value of the hydraulic system variable, i.e. the total flow $\varphi_{tot\_i}$ or system pressure $\Delta p_i$ value, respectively, measured with the regulating valves set to the positions $Pos_{Vn\_i}$ of step S111. In an embodiment, the total flow $\varphi_{tot}$ is measured by the common flow sensor 12 and reported to or requested by the computer system 10, directly or via the hydraulic network controller 15. Alternatively, the total flow $\varphi_{tot}$ is calculated by the computer system 10 or the hydraulic network controller 15 from individual values of flow $\varphi_1$, $\varphi_2$ through the zones $Z_1$, $Z_2$, measured by individual flow sensors arranged in the zones $Z_1$, $Z_2$.

As indicated by step S114, for measuring the same value of the hydraulic system variable, i.e. the total flow $\varphi_{tot}$ or system pressure $\Delta p_i$ value, respectively, at different settings of the regulating valves $V_1$, $V_2$ (different valve positions $Pos_{Vn\_i}$), a loop with repeated setting of valve positions $Pos_{Vn\_i}$ (step S111) and measurement of the hydraulic system variable (step S112) may be required.

In step S113, the computer system 10 stores the data set $S_i$ with the valve positions $Pos_{Vn\_i}$ of step S111 and the value of the hydraulic system variable, i.e. the total flow $\varphi_{tot\_i}$ or system pressure $\Delta p_i$, respectively, measured in step S112 with the regulating valves set to these positions $Pos_{Vn\_i}$.

As indicated by step S115, steps S111, S112, and S113 are repeated until a defined number of data set $S_i$ have been recorded by the computer system 10. For example, the number of data set $S_i$ is defined in the system evaluation protocol or script.

In step S121 shown in FIG. 5, the computer system 10 obtains the current value of the hydraulic system variable, i.e. the total flow $\varphi_{tot\_i}$ or system pressure $\Delta p_i$, respectively, as described above in the context of step S112. In an embodiment, the value of the hydraulic system variable is time stamped, e.g. by the common flow sensor 12 (or a pressure sensor) or the hydraulic network controller 15.

In step S122, the computer system 10 obtains the current valve positions $Pos_{Vn\_i}$ of the regulating valves $V_1$, $V_2$ at which positions the value of the hydraulic system variable is measured in step S121. The valve positions $Pos_{Vn\_i}$ and the corresponding value of the hydraulic system variable are recorded concurrently or, alternatively, the valve positions $Pos_{Vn\_i}$ time stamped by the controllers $R_1$, $R_2$ or the hydraulic network controller 15.

In step S123, the computer system 10 stores data sets $S_i$ with valve positions $Pos_{Vn\_i}$ and values of the hydraulic system variable, i.e. the total flow $\varphi_{tot\_i}$ or system pressure $\Delta p_i$ values, respectively, measured with the regulating valves set to these positions $Pos_{Vn\_i}$. Depending on the embodiment, the corresponding valve positions $Pos_{Vn\_i}$ and values of the hydraulic system variable are obtained from concurrent measurements in steps S121 and S122, or grouped based on matching time stamps provided with the valve positions $Pos_{Vn\_i}$ and values of the hydraulic system variable from steps S121 and S122.

As indicated by step S124, time stamped values of valve positions $Pos_{Vn\_i}$ and measurements of values of the hydraulic system variable may be reported repeatedly in steps S121 and S122, for subsequent time stamped based (synchronized) grouping in step S123.

As indicated by step S125, steps S121, S122, and S123 are repeated on a continuous basis.

As illustrated in FIG. 3, in step S2, the computer system 10 determines groups of related data sets $S_i$ with the same value of the hydraulic system variable, e.g. the same total flow $\varphi_{tot\_i}$ or system pressure $\Delta p_i$, respectively.

In step S3, the computer system 10 calculates the characteristic parameters of the hydraulic network 1, using the groups of related data sets $S_i$ of step S2.

Figure 6:
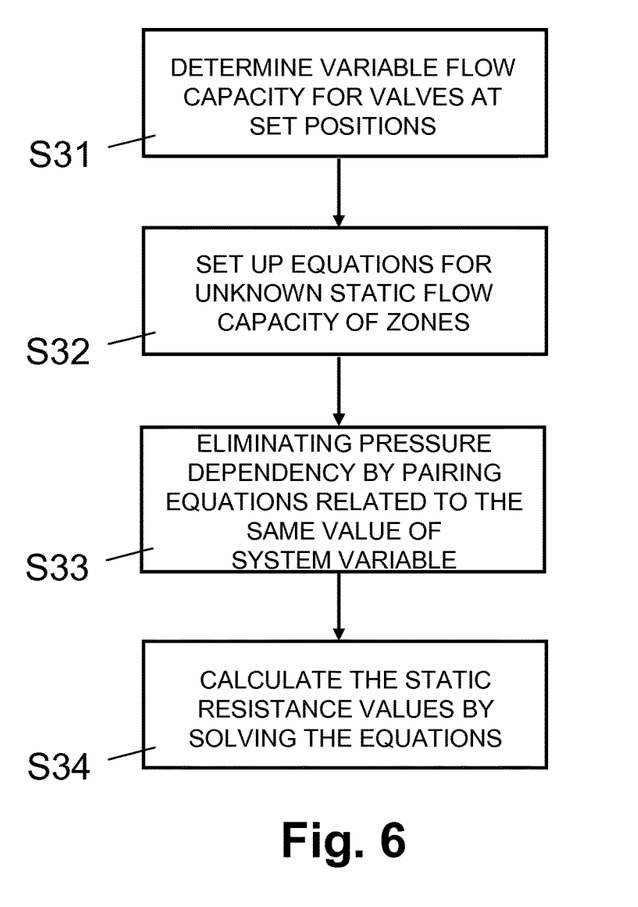
FIG. 6: shows a flow diagram illustrating an exemplary sequence of steps for calculating characteristic parameters of a hydraulic network using groups of related data sets.

As illustrated in FIG. 6, in step S31, the computer system 10 determines the variable flow capacity (flow coefficient) values $K_{valve,a,i}$, $K_{valve,b,i}$, for the regulating valves $V_1$, $V_2$ at their recorded valve positions $Pos_{Vn\_i}$ using their respective valve characteristics.

In step S32, the computer system 10 sets up equations for the unknown flow capacity (flow coefficient) values of the hydraulic networks' zones $Z_1$, $Z_2$.

For instance, in the simplified example of FIG. 2, the static flow capacity (flow coefficient) values $K_{ex,a}$ and $K_{ex,b}$ of the thermal exchangers 13, 14 of zones $Z_1$, $Z_2$, and the total system flow capacity $K_{sys,1}$ and $K_{sys,2}$ of a particular system or measurement setting (indices 1 and 2) are unknown. In the controlled mode of setting valve positions, in a first measurement series, two measurements are recorded with a first group of data sets $S_1$ and $S_2$ which have both the same value of the hydraulic system variable, e.g. the same total flow $\varphi_{tot\_i}$ or system pressure $\Delta p_i$, respectively, and, in a second measurement series, two further measurements are recorded with a second group of data sets $S_3$ and $S_4$ which have both the same value of the hydraulic system variable.

In a first measurement of the first measurement series, the valve $V_1$ is set to an open valve position and valve $V_2$ is set to a closed valve position, and a first data set is recorded, including the value of the hydraulic system variable and the valve position and/or corresponding variable flow capacity value $K_{valve,a,1}$ for the valve $V_1$. In case of the flow-based approach, the first data set $S_1 = \{\varphi_1; (Pos_{V1\_1} = K_{valve,a,1}; Pos_{V2\_1} = 0)\}$ includes the total flow $\varphi_1$ as value of the hydraulic system variable. As the valve $V_2$ is closed completely, using equation (3), the total system flow capacity is calculated solely from the flow capacities of zone $Z_1$, as indicated in equation (5):

$$\frac{\Delta P(\Phi_1)}{\Phi_1^2} = \frac{1}{K_{sys,1}^2} = \frac{1}{K_{valve,a,1}^2} + \frac{1}{K_{ex,a}^2} \quad (5)$$

In a second measurement of the first measurement series, the valve $V_2$ is set to an open valve position and valve $V_1$ is set to a closed valve position, such that the same value of the hydraulic system variable is measured as in the first measurement, and a second data set is recorded, including the value of the hydraulic system variable and the valve position and/or corresponding variable flow capacity value $K_{valve,b,2}$ for the valve $V_2$. In the flow-based approach, the second data set $S_2 = \{\varphi_1; (Pos_{V1\_2}=0; Pos_{V2\_2}=K_{valve,b,2})\}$ includes the total flow $\varphi_1$ as value of the hydraulic system variable. As the valve $V_1$ is closed completely, using equation (3), the total system flow capacity is calculated solely from the flow capacities of zone $Z_2$, as indicated in equation (6):

$$\frac{\Delta P(\Phi_1)}{\Phi_1^2} = \frac{1}{K_{sys,1}^2} = \frac{1}{K_{valve,b,2}^2} + \frac{1}{K_{ex,b}^2} \quad (6)$$

In a third measurement, associated with a second measurement series, the valves $V_1$ and $V_2$ are both set to an open valve position, and a third data set is recorded, including the value of the hydraulic system variable and the valve position and/or corresponding variable flow capacity values $K_{valve,a,3}$ and $K_{valve,b,3}$ for the valves $V_1$ and $V_2$. In the flow-based approach, the third data set $S_3 = \{\varphi_2; (Pos_{V1\_3}=K_{valve,a,3}; Pos_{V2\_3}=K_{valve,b,3})\}$ includes the total flow $\varphi_2$ as value of the hydraulic system variable. Using equations (2) and (3), the total system flow capacity is calculated from the flow capacities of zones $Z_1$ and $Z_2$, as indicated in equations (7) and (8):

$$\frac{1}{K_{sys,2}^2} = \frac{1}{(N_{zone,a,2} + K_{zone,b,2})^2} \quad (7)$$

$$= \frac{1}{\left(\sqrt{\frac{1}{K_{valve,a,2}^2} + \frac{1}{K_{ex,a}^2}} + \sqrt{\frac{1}{K_{valve,b,a}^2} + \frac{1}{K_{ex,b}^2}}\right)^2}$$

$$\frac{1}{K_{sys,2}^2} = \frac{1}{(N_{zone,a,4} + K_{zone,b,4})^2} \quad (8)$$

$$= \frac{1}{\left(\sqrt{\frac{1}{K_{valve,a,4}^2} + \frac{1}{K_{ex,a}^2}} + \sqrt{\frac{1}{K_{valve,b,4}^2} + \frac{1}{K_{ex,b}^2}}\right)^2}$$

In a fourth measurement, associated with the second measurement series, the valves $V_1$ and $V_2$ are both set to an open valve position, different from the valve positions in the third measurement, such that the same value of the hydraulic system variable is measured as in the third measurement, and a fourth data set is recorded, including the value of the hydraulic system variable and the valve position and/or corresponding variable flow capacity values $K_{valve,a,4}$ and $K_{valve,b,4}$ for the valves $V_1$ and $V_2$. In the flow-based approach, the fourth data set $S_4 = \{\varphi_2; (Pos_{V1\_4}=K_{valve,a,4};$ $Pos_{V2\_4}=K_{valve,b,4})\}$ includes the total flow $\varphi_2$ as value of the hydraulic system variable. Using equations (2) and (3), the total system flow capacity is calculated from the flow capacities of zones $Z_1$ and $Z_2$, as indicated in equations (9) and (10):

$$\frac{\Delta P(\Phi_2)}{\Phi_2^2} = \frac{1}{K_{sys,2}^2} \quad (9)$$

$$= \frac{1}{\left(\sqrt{\frac{1}{K_{valve,a,4}^2} + \frac{1}{K_{ex,a}^2}} + \sqrt{\frac{1}{K_{valve,b,4}^2} + \frac{1}{K_{ex,b}^2}}\right)^2}$$

$$\frac{\Delta P(\Phi_2)}{\Phi_2^2} = \frac{1}{K_{sys,2}^2} \quad (10)$$

$$= \frac{1}{\left(\sqrt{\frac{1}{K_{valve,a,4}^2} + \frac{1}{K_{ex,a}^2}} + \sqrt{\frac{1}{K_{valve,b,4}^2} + \frac{1}{K_{ex,b}^2}}\right)^2}$$

As illustrated in FIG. 6, in step S33, the pressure dependence is eliminated by pairing equations related to the same value of the hydraulic system variable, i.e. the same total flow or system pressure, respectively.

In the present simplified example of the flow-based approach, equations (5) and (6) associated with the first measurements series for flow $\varphi_1$ are set equal:

$$\frac{1}{K_{valve,b,2}^2} + \frac{1}{K_{ex,b}^2} = \frac{1}{K_{valve,a,1}^2} + \frac{1}{K_{ex,a}^2} \quad (11)$$

$$\frac{1}{K_{ex,b}^2} = \frac{1}{K_{valve,a,1}^2} - \frac{1}{K_{valve,b,2}^2} + \frac{1}{K_{ex,a}^2} \quad (12)$$

Moreover, equations (8) and (10) associated with the second measurements series for flow $\varphi_2$ are set equal:

$$\frac{1}{\left(\sqrt{\frac{1}{K_{valve,a,4}^2} + \frac{1}{K_{ex,a}^2}} + \sqrt{\frac{1}{K_{valve,b,4}^2} + \frac{1}{K_{ex,b}^2}}\right)^2} = \quad (13)$$

$$\frac{1}{\left(\sqrt{\frac{1}{K_{valve,a,2}^2} + \frac{1}{K_{ex,a}^2}} + \sqrt{\frac{1}{K_{valve,b,2}^2} + \frac{1}{K_{ex,b}^2}}\right)^2}$$

$$\frac{1}{\sqrt{\frac{1}{K_{valve,a,2}^2} + \frac{1}{K_{ex,a}^2}}} + \frac{1}{\sqrt{\frac{1}{K_{valve,b,2}^2} + \frac{1}{K_{ex,b}^2}}} = \quad (14)$$

$$\frac{1}{\sqrt{\frac{1}{K_{valve,a,4}^2} + \frac{1}{K_{ex,a}^2}}} + \frac{1}{\sqrt{\frac{1}{K_{valve,b,4}^2} + \frac{1}{K_{ex,b}^2}}}$$

Subsequently, in step S34, the computer system 10 calculates the static flow capacity values by solving the set up equations.

In the present simplified example, the equations (12) and (14) are solved for the flow capacity $K_{ex,a}$ of the thermal exchanger 13 of zone $Z_1$ and the flow capacity $K_{ex,b}$ for the thermal exchanger 14 of zone $Z_2$. For example, the equation (14) is solved for the flow capacity $K_{ex,a}$ of the thermal exchanger 13 of zone $Z_1$ by substituting the flow capacity $K_{ex,b}$ for the thermal exchanger 14 of zone $Z_2$ with the value from equation (12) and using the known variable flow capacity values $K_{valve,a,1}$, $K_{valve,b,2}$, $K_{valve,a,3}$, $K_{valve,b,3}$, $K_{valve,a,4}$, $K_{valve,b,4}$ of the regulating valves $V_1$ and $V_2$ at the stored valve positions $Pos_{V1\_1}$, $Pos_{V2\_2}$, $Pos_{V1\_2}$, $Pos_{V2\_3}$, $Pos_{V1\_4}$, $Pos_{V2\_4}$.

As one skilled in the art will understand, in accordance with the simple example described above, the computer system 10 is configured to calculate in step S3 the characteristic parameters of hydraulic networks 1 having many more zones $Z_1$, $Z_2$, and a more refined configuration of flow capacity values, using a correspondingly greater number of groups of related data sets obtained in step S2.

In an alternative or additional process, the flow capacity values of the hydraulic network 1 are calculated from a plurality of stored data sets $S_i$ using statistical evaluation methods. Specifically, the computer 10 performs statistical methods, e.g. the Monte Carlo method, for determining estimated values of the characteristic parameters, using a plurality of the recorded data sets $S_i$ as input data. More specifically, using statistical methods, the computer system 10 generates an initial first estimate of the characteristic parameters using data sets $S_i$ recorded in an initial first time period. Subsequently, in an iterative approach, the computer system 10 generates a refined estimate of the characteristic parameters, using the initial first estimate of the characteristic parameters and data sets $S_i$ recorded in a second time period, after the first time period.

In step S4, the computer system 10 (or the hydraulic network controller 15 and/or one or more of the controllers $R_1$, $R_2$) uses the characteristic parameters of the hydraulic network 1 to determine and/or set operational values of the hydraulic network 1.

For example, using the calculated characteristic parameters of the hydraulic network 1, the computer system 10 calculates for the current total flow $\varphi_{tot}$ the individual flow values $\varphi_1$, $\varphi_2$ through the zones $Z_1$, $Z_2$ or regulating valves $V_1$, $V_2$, respectively. Specifically, the computer system 10 calculates the individual flow values $\varphi_1$, $\varphi_2$ at the current total flow $\varphi_{tot}$ using the calculated static flow capacities of the zones $Z_1$, $Z_2$, e.g. the flow capacities $K_{ex,a}$, $K_{ex,b}$ of the thermal exchangers 13, 14, and the known variable flow capacity values $K_{valve,a}$, $K_{valve,b}$ of the regulating valves $V_1$, $V_2$ at the current valve positions $Pos_{V1}$, $Pos_{V2}$.

In a further example, using the calculated characteristic parameters of the hydraulic network 1, the computer system 10 is configured to perform an optimizer function for minimizing the power of the pump 11 required for obtaining set target flow values $\varphi_1$, $\varphi_2$ through the zones $Z_1$, $Z_2$, as defined by system/user demands. Specifically, the computer system 10 is configured to determine whether the regulating valve $V_1$, $V_2$ in the zone $Z_1$, $Z_2$, with the highest demand can be opened further to a more optimal valve position or opening level, e.g. to an 80% opened orifice, in order to reduce the variable flow capacity values $K_{valve,a}$, $K_{valve,b}$ of the regulating valves $V_1$, $V_2$ at increased (more open) valve positions $Pos_{V1}$, $Pos_{V2}$ (whereas completely open vale positions $Pos_{V1}$, $Pos_{V2}$ of the regulating valves $V_1$, $V_2$ are being avoided). If that is the case, the computer system 10 is configured to calculate for the regulating valves $V_1$, $V_2$ the reduced variable flow capacity values $K_{valve,a}$, $K_{valve,b}$ and the respectively adjusted (more opened) valve positions $Pos_{V1}$, $Pos_{V2}$. The reduced variable flow capacity values $K_{valve,a}$, $K_{valve,b}$ and adjusted valve positions $Pos_{V1}$, $Pos_{V2}$ are determined by setting the regulating valve $V_1$, $V_2$, in the zone $Z_1$, $Z_2$ with the highest demand to the more optimal valve position or opening level, by determining the reduced variable flow capacity value $K_{valve,a}$, $K_{valve,b}$ for the respective valve at the more optimal position, and by calculating the reduced variable flow capacity values $K_{valve,a}$, $K_{valve,b}$ of the other regulating valves $V_1$, $V_2$ of the hydraulic network 1, such as to maintain the proportional distribution of flow into the individual zones $Z_1$, $Z_2$ and meet the individual zone's flow demands (by maintaining the total flow $\varphi_{tot}$). Subsequently, the computer system 10 is configured to calculate the reduced overall system flow capacity $K_{sys}$ from the reduced variable flow capacity values $K_{valve,a}$, $K_{valve,b}$ of the regulating valves $V_1$, $V_2$ and the calculated static flow capacities $K_{ex,a}$, $K_{ex,b}$ of the zones $Z_1$, $Z_2$ and to calculate and set the reduced power for the pump 11 to generate the required total flow $\varphi_{tot}$ at the reduced overall system flow capacity $K_{sys}$.

The computer system 10, the hydraulic network controller 15, and/or one or more of the controllers $R_1$, $R_2$ are further configured to determine for the hydraulic system's pump 11 the characteristic pump curve parameters $C_1$ and $C_2$ of the linear pump curve, $\Delta P = \Phi C_1 + C_0$, defined above in equation (4). For calculating, the characteristic pump curve parameters $C_1$ and $C_2$, the respective processors use at least two measurements of the total flow $\varphi_{tot}$ with all but one of the regulating valves $V_1$, $V_2$ set to a closed valve position. For calculating, the characteristic pump curve parameters $C_1$ and $C_2$, the respective processors further use the valve characteristics of the respective one regulating valve $V_1$, $V_2$ that is not set to the closed valve position. Specifically, the regulating valve $V_1$, $V_2$ that is left open for the measurements is set to a different valve position for each of the at least two measurements of the total flow $\varphi_{tot}$. More specifically, the regulating valve $V_1$, $V_2$ that is left open for the measurements is set to valve position that places the respective regulating valve $V_1$, $V_2$ as the "dominating" flow capacity in the calculation of the overall flow capacity of the respective zone $Z_1$, $Z_2$ that is regulated by the respective regulating valve $V_1$, $V_2$, as will be explained in the following paragraph.

Using the fundamental relationship for flow capacities (flow coefficients) in series, as defined in equation (3) above, $$\frac{1}{K_{total}^2} = \frac{1}{K_1^2} + \frac{1}{K_2^2},$$

it is apparent that one of the terms $K_1$ or $K_2$ dominates the resulting value $K_{total}$ when their values differ, as they are squared in the equation. Because of the squaring of the terms $K_1$ or $K_2$, the difference between the terms $K_1$, $K_2$ does not need to be large for one term $K_1$, $K_2$ to dominate. For example, with reference to the simplified representation 1' of the hydraulic network 1 of FIG. 2, when the valve $V_2$ associated with zone $Z_2$ is closed and the measurement is taken with valve $V_1$ being only minimally open, e.g. a few percents (1%-5%) or degrees)(3°-15°), calculation of the pressure $\Delta P$ may approximated as indicated below in equation (15):

$$\Delta P = \frac{\Phi_{tot}^2}{K_{sys}^2} = \Phi_{tot}^2 \left( \frac{1}{K_{valve,a}^2} + \frac{1}{K_{ex,a}^2} \right) \approx \frac{\Phi_{tot}^2}{K_{valve,a}^2} \qquad (15)$$

with $\Delta P$ being the pump pressure, $\Phi_{tot}$ being the measured total flow, $K_{sys}$ being the total system flow capacity, $K_{valve,a}$ being the valve flow capacity, and $K_{ex,a}$ being the additional static flow capacity of zone $Z_1$. For a linear pump curve $\Delta P = \Phi C_1 + C_0$, only two measurements $\Phi_{tot\_1}$, $\Phi_{tot\_2}$ with the minimally opened regulating valve $V_1$ are required to determine the pump curve parameters $C_1$ and $C_2$, because the pressure $\Delta P$ may be approximated according to equation (15), from the measured flow $\Phi_{tot\_1}$, $\Phi_{tot\_2}$ and the variable flow capacity $K_{valve,a,1}$, $K_{valve,a,2}$ of the regulating valve $V_1$, that is defined by the known valve characteristics and the specific position of the regulating valve $V_1$. From the two measurements, the following equations (16) and (17) can be defined and solved for the unknown pump curve parameters $C_1$ and $C_2$:

$$\Delta P_1 \approx \frac{\Phi_{tot\_1}^2}{K_{valve,a,1}^2} \Rightarrow \frac{\Phi_{tot\_1}^2}{K_{valve,a,1}^2} = C_1 \Phi_{tot\_1} + C_0 \quad (16)$$

$$\Delta P_2 \approx \frac{\Phi_{tot\_2}^2}{K_{valve,a,2}^2} \Rightarrow \frac{\Phi_{tot\_2}^2}{K_{valve,a,2}^2} = C_1 \Phi_{tot\_2} + C_0 \quad (17)$$

Figure 9:
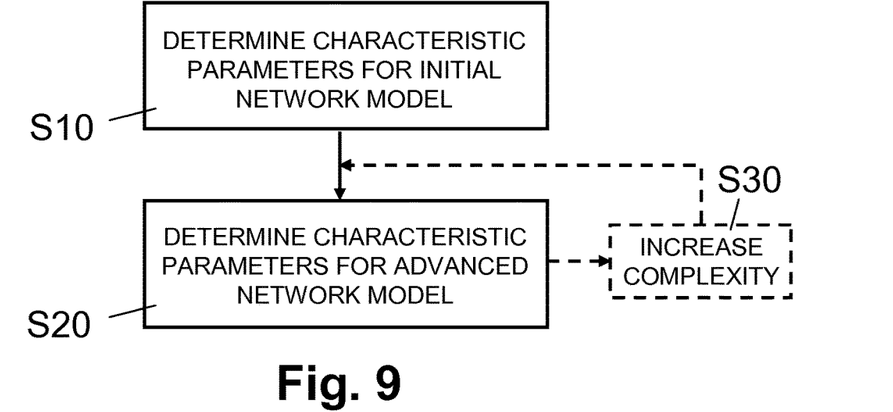
FIG. 9: shows a flow diagram illustrating an exemplary sequence of steps for calculating characteristic parameters for an initial (simple) model and an advanced model of the hydraulic network using groups of related data sets.

As illustrated in Figure g, in an embodiment, the computer system 10, the hydraulic network controller 15, and/or one or more of the controllers $R_1$, $R_2$ are further configured to determine, in step S10, the characteristic parameters for an initial, simplified model of the hydraulic network (e.g. a simplified model as illustrated in FIG. 2) and, to determine subsequently, in step S20, the characteristic parameters for an advanced, comparatively more complex and more detailed model of the hydraulic network 1. (e.g. an advanced model as illustrated in FIG. 1).

The complexity of the model is increased by increasing the level of detail of the model of the hydraulic network 1, e.g. by adding to the model derived in previous steps S10, S20 further characteristic parameters of components in the zones $Z_1$, $Z_2$, e.g. static line flow capacities $K_{line,a}$, $K'_{line,a}$, $K_{line,b}$, $K'_{line,b}$ of the zones $Z_1$ or $Z_2$, and/or static flow capacities $K'_{ex,a}$ and $K'_{ex,b}$ of the thermal exchangers 13 or 14, and/or the static flow capacity $K_{sensor}$ of the common flow sensor 12.

In step S10, the characteristic parameters for the initial, simplified model of the hydraulic network are determined from a plurality of stored data sets $S_i$, as described above with reference to FIGS. 3, 4, 5, and 6, and possibly using statistical evaluation methods.

In step S20, the characteristic parameters for the advanced model of the hydraulic network 1 are determined by using the characteristic parameters of the initial, simplified model and a plurality of stored data sets $S_i$ to set up and solve equations for the advanced model of the hydraulic network 1.

As indicated in FIG. 9 by step S30, in an embodiment, the level of complexity and detail of the model of the hydraulic network 1 is increased between successive executions of step S20 for an iterative improvement of the accuracy of the model of the hydraulic network 1. Accordingly, with an increase of complexity in step S30 and repeated execution of step S20, the characteristic parameters for the increasingly advanced model of the hydraulic network 1 are determined by using the characteristic parameters of the previously determined model and a plurality of stored data sets $S_i$ to set up and solve equations for the increasingly advanced model of the hydraulic network 1.

It should be noted that, in the description, the computer program code has been associated with specific functional modules or processors, and the sequence of the steps has been presented in a specific order, one skilled in the art will understand, however, that the computer program code may be structured differently and that the order of at least some of the steps could be altered, without deviating from the scope of the invention. For example, one skilled in the art will understand that at least some of the functions and operations described above can be implemented and performed on the computer system 10, the hydraulic network controller 15, and/or one or more of the controllers $R_1$, $R_2$.

The invention claimed is:

1. A method of determining characteristic parameters of a hydraulic network (1) that comprises a plurality of parallel zones ($Z_1$, $Z_2$) with a regulating valve ($V_1$, $V_2$) in each zone ($Z_1$, $Z_2$) for regulating a flow of fluid ($\varphi_1$, $\varphi_2$) through the respective zone ($Z_1$, $Z_2$), the regulating valves ($V_1$, $V_2$) representing a variable flow capacity ($Kv_{v1}$, $Kv_{v2}$) in each zone ($Z_1$, $Z_2$) and the characteristic parameters including static flow capacity values ($K_{ex,a}$, $K_{ex,b}$) of the zones ($Z_1$, $Z_2$), the method comprising:
   determining a value of a hydraulic system variable of the hydraulic network (1);
   recording in a computer (10) measurement data sets which include a determined value of the hydraulic system variable and valve positions of the regulating valves ($V_1$, $V_2$) set for the determined value of the hydraulic system variable;
   calculating by the computer (10) the characteristic parameters from a plurality of measurement data sets, by grouping related measurement data sets, which include the same value of the hydraulic system variable but different valve positions, and using the value of flow capacity ($K_{valve,a}$, $K_{valve,b}$) of the regulating valves ($V_1$, $V_2$) at the valve positions included in the data sets; and
   using the characteristic parameters of the hydraulic network (1) to set operational values of the hydraulic network (1).

2. The method of claim 1, wherein recording the measurement data sets comprises the computer (10) recording the related measurement data sets during a measurement phase by transmitting control signals to the regulating valves ($V_1$, $V_2$) to set the regulating valves ($V_1$, $V_2$) to varying valve positions resulting a particular value of the hydraulic system variable.

3. The method of claim 1, wherein the computer (10) is recording the measurement data sets during regular operation of the hydraulic network (1); and the computer (10) determines the related measurement data sets by selecting the measurement data sets that include the same value of the hydraulic system variable but different valve positions of the valves ($V_1$, $V_2$).

4. The method of claim 1, wherein calculating the characteristic parameters comprises the computer (10) setting up a plurality of equations for the hydraulic network (1), including the static flow capacity values ($K_{ex,a}$, $K_{ex,b}$) of the zones ($Z_1$, $Z_2$) as unknown variables, using the value of flow capacity ($K_{valve,a}$, $K_{valve,b}$) of the regulating valves ($V_1$, $V_2$) at the valve positions recorded in the related measurement data sets, and solving the plurality of equations based on the fact that the related measurement data sets were recorded for the same value of the hydraulic system variable.

5. The method of claim 1, wherein calculating the characteristic parameters comprises the computer (10) to perform statistical algorithms, using the recorded measurement data sets as input data for determining estimated values of the characteristic parameters.

6. The method of claim 1, wherein calculating the characteristic parameters comprises the computer (10) performing statistical algorithms, using as input data measurement data sets, recorded in a first time period, for determining a first estimate of the characteristic parameters, and using as input data measurement data sets, recorded in a second time period after the first time period, and the first estimate of the characteristic parameters, for determining a refined second estimate of the characteristic parameters.

7. The method of claim 1, further comprising the computer (10) determining a first set of characteristic parameters for an initial, simplified first model of the hydraulic network (1), and determining a second set of characteristic parameters for an advanced, comparatively more detailed second model of the hydraulic network (1), using the first set of characteristic parameters.

8. The method of claim 1, further comprising the computer (10) determining the value of flow capacity ($K_{valve,a}$, $K_{valve,b}$) of the regulating valves ($V_1$, $V_2$) using valve characteristics stored at the computer (10).

9. The method of claim 1, wherein the measurement data sets are stored in a cloud-based computer system; and the characteristic parameters are calculated by a computer (10) of the cloud-based computer system from a plurality of the stored measurement data sets.

10. The method of claim 1, wherein the hydraulic network (1) further comprises a pump (11); and the method further comprises the computer (10) calculating characteristic parameters ($C_0$, $C_1$) of a pump curve of the pump (11), using at least two measurements of the total flow ($\varphi_{tot}$), measured with all but one of the regulating valves ($V_1$, $V_2$) set to a closed valve position, and valve characteristics of the one regulating valve ($V_1$, $V_2$) that is not set to the closed valve position but to a different valve position for each of the at least two measurements of the total flow ($\varphi_{tot}$).

11. The method of claim 1, wherein the hydraulic network (1) further comprises a pump (11); and the method further comprises the computer (10) calculating and setting adjusted valve positions with reduced variable flow capacity ($Kv_{v1}$, $Kv_{v2}$) of the regulating valves ($V_1$, $V_2$) and reduced power of the pump (11), while maintaining the total flow of fluid ($\varphi_{tot}$), using the characteristic parameters of the hydraulic network (1) calculated by the computer (10).

12. The method of claim 1, wherein at least some of the regulating valves ($V_1$, $V_2$) are implemented as six-way valves configured to couple a respective zone ($Z_1$, $Z_2$) alternatively to a first fluid transportation circuit for heating or to a second fluid transportation circuit for cooling, and to regulate the flow of fluid ($\varphi_1$, $\varphi_2$) from the first or second fluid transportation, respectively, through the zone ($Z_1$, $Z_2$); and the method comprises the computer (10) determining the characteristic parameters of a first hydraulic sub-network that comprises the zones ($Z_1$, $Z_2$) coupled to the first fluid transportation circuit for heating, and of a second hydraulic sub-network that comprises the zones ($Z_1$, $Z_2$) coupled to the second fluid transportation circuit for cooling.

13. The method of claim 1, wherein at least some of the regulating valves ($V_1$, $V_2$) are configured to further regulate at least one of: thermal power, thermal energy, and temperature difference in the respective zone ($Z_1$, $Z_2$).

14. The method of claim 1, wherein a system pressure ($\Delta P$) of the hydraulic network (1) is determined as the hydraulic system variable of the hydraulic network (1); the measurement data sets include a determined system pressure ($\Delta P$) and valve positions of the regulating valves ($V_1$, $V_2$) set at the determined system pressure ($\Delta P$); and the characteristic parameters are calculated by the computer (10) from a plurality of measurement data sets, by grouping related measurement data sets, which include the same system pressure ($\Delta P$) but different valve positions, and using the value of flow capacity ($K_{valve,a}$, $K_{valve,b}$) of the regulating valves ($V_1$, $V_2$) at the valve positions included in the data sets.

15. The method of claim 1, wherein a total flow of fluid ($\varphi_{tot}$) into all the zones ($Z_1$, $Z_2$) is determined as the hydraulic system variable of the hydraulic network (1); the measurement data sets include a determined total flow ($\varphi_{tot}$) and valve positions of the regulating valves ($V_1$, $V_2$) set for the determined total flow ($\varphi_{tot}$); and the characteristic parameters are calculated by the computer (10) from a plurality of measurement data sets, by grouping related measurement data sets, which include the same total flow ($\varphi_{tot}$) but different valve positions, and using the value of flow capacity ($K_{valve,a}$, $K_{valve,b}$) of the regulating valves ($V_1$, $V_2$) at the valve positions included in the data sets.

16. The method of claim 15, wherein the hydraulic network (1) further comprises a bypass line in parallel to the zones (Z1, Z2) with a valve ($V_1$, $V_2$) in the bypass line for setting a bypassing flow of fluid ($\varphi_1$, $\varphi_2$) through the bypass line, and the characteristic parameters further include a static flow capacity value representative of the bypass line and its valve; and wherein the method further comprises determining in the computer (10) the total flow of fluid ($\varphi_{tot}$) into all the zones ($Z_1$, $Z_2$) and the bypass line; and calculating by the computer (10) the characteristic parameters from a plurality of measurement data sets, by grouping related measurement data sets which include the same total flow ($\varphi_{tot}$) into all the zones ($Z_1$, $Z_2$) and the bypass line.

17. A computer system for determining characteristic parameters of a hydraulic network (1) that comprises a plurality of parallel zones ($Z_1$, $Z_2$) with a regulating valve ($V_1$, $V_2$) in each zone ($Z_1$, $Z_2$) for regulating a flow of fluid ($\varphi_1$, $\varphi_2$) through the respective zone ($Z_1$, $Z_2$), the regulating valves ($V_1$, $V_2$) representing a variable flow capacity ($K_{valve,a}$, $K_{valve,b}$) in each zone ($Z_1$, $Z_2$) and the characteristic parameters including static flow capacity values ($K_{ex,a}$, $K_{ex,b}$) of the zones ($Z_1$, $Z_2$), the computer system comprising a processor configured to:
   store measurement data sets which include valve positions for a value of a hydraulic system variable of the hydraulic network (1) measured with the regulating valves ($V_1$, $V_2$) set to the respective valve positions;
   calculate the characteristic parameters from a plurality of measurement data sets, by grouping related measurement data sets, which include the same value of the hydraulic system variable but different valve positions, and using the value of flow capacity ($K_{valve,a}$, $K_{valve,b}$) of the regulating valves ($V_1$, $V_2$) at the valve positions included in the data sets; and
   use the characteristic parameters of the hydraulic network (1) to set operational values of the hydraulic network (1).

18. The computer system (10) of claim 17, wherein the processor is configured to calculate the characteristic parameters by setting up a plurality of equations for the hydraulic network (1), including the static flow capacity values ($K_{ex,a}$, $K_{ex,b}$) of the zones ($Z_1$, $Z_2$) as unknown variables, using the value of flow capacity ($K_{valve,a}$, $K_{valve,b}$) of the regulating valves ($V_1$, $V_2$) at the valve positions recorded in the related measurement data sets, and solving the plurality of equations based on the fact that the related measurement data sets were recorded for the same value of the hydraulic system variable.

19. A computer program product comprising a non-transient computer-readable medium having stored thereon computer program code configured to control one or more processors of a computer system (10) for determining characteristic parameters of a hydraulic network (1) that comprises a plurality of parallel zones ($Z_1$, $Z_2$) with a regulating valve ($V_1$, $V_2$) in each zone ($Z_1$, $Z_2$) for regulating a flow of fluid ($\varphi_1$, $\varphi_2$) through the respective zone ($Z_1$, $Z_2$), the regulating valves ($V_1$, $V_2$) representing a variable flow capacity ($K_{valve,a}$, $K_{valve,b}$) in each zone ($Z_1$, $Z_2$) and the characteristic parameters including static flow capacity values ($K_{ex,a}$, $K_{ex,b}$) of the zones ($Z_1$, $Z_2$), such that the computer system (10):

stores measurement data sets which include valve positions for a value of a hydraulic system variable of the hydraulic network (1) measured with the regulating valves ($V_1$, $V_2$) set to the respective valve positions;

calculate the characteristic parameters from a plurality of measurement data sets, by grouping related measurement data sets, which include the same value of the hydraulic system variable but different valve positions, and using the value of flow capacity ($K_{valve,a}$, $K_{valve,b}$) of the regulating valves ($V_1$, $V_2$) at the valve positions included in the data sets; and uses the characteristic parameters of the hydraulic network (1) to set operational values of the hydraulic network (1).

20. The computer program product of claim 19, wherein the computer program code is configured to control the one or more processors of the computer system (10) such that the computer system (10) calculates the characteristic parameters by setting up a plurality of equations for the hydraulic network (1), including the static flow capacity values ($K_{ex,a}$, $K_{ex,b}$) of the zones ($Z_1$, $Z_2$) as unknown variables, using the value of flow capacity ($K_{valve,a}$, $K_{valve,b}$) of the regulating valves ($V_1$, $V_2$) at the valve positions recorded in the related measurement data sets, and solving the plurality of equations based on the fact that the related measurement data sets were recorded for the same value of the hydraulic system variable of the hydraulic network (1).

* * * * *